United States Patent [19]
Glorieux

[11] 4,174,156
[45] Nov. 13, 1979

[54] OPTICAL LENS FOR DIFFERENTIAL CORRECTION

[76] Inventor: Gilbert Glorieux, 72, rue Achille Viadieu, 31400 Toulouse, France

[21] Appl. No.: 847,102

[22] Filed: Oct. 31, 1977

[30] Foreign Application Priority Data

Nov. 2, 1976 [FR] France ................................ 76 33208

[51] Int. Cl.² ............................ G02B 3/12; G02C 7/06
[52] U.S. Cl. ............................... 351/168; 350/179; 350/180; 351/161
[58] Field of Search ................ 350/179, 180; 351/161, 351/168, 169

[56] References Cited

U.S. PATENT DOCUMENTS

| | | | |
|---|---|---|---|
| 3,598,479 | 8/1971 | Wright | 350/180 |
| 3,614,215 | 10/1971 | Macta | 351/168 |

FOREIGN PATENT DOCUMENTS 1279252  11/1961  France ..................................... 351/161

*Primary Examiner*—John K. Corbin
*Assistant Examiner*—Scott J. Sugarman
*Attorney, Agent, or Firm*—Shlesinger, Arkwright, Garvey & Dinsmore

[57] ABSTRACT

An optical lens for differential correction comprising two transparent walls defining an enclosed space having therein a quantity of a transparent liquid with a predetermined optical index; the walls are so formed as to provide at the optical center a capillary space into which the liquid is aspirated when the lens is tilted at a predetermined angle for changing the power of the lens.

5 Claims, 12 Drawing Figures

OPTICAL LENS FOR DIFFERENTIAL CORRECTION

The invention concerns a new optical correction lens. This lens can be of the necessary dimensions and form to be applied to the cornea of the eye as a contact lens (soft or hard lens); it can also be adapted to be mounted in a spectacle frame.

It is known that after a certain age, the accomodation faculties of the eye weaken and then presbyopia occurs, which can be corrected by bifocal lenses and sometimes trifocal lenses, adapted to the sight of each individual (neutral glass with convergent lens at the bottom for presbyopes with normal distance vision and with superposed portions with different powers for the myopes). These power differences are obtained either by variation of the optical index of the lens (different index range fused into the lens) or by variations of the curvature (which can be progressive).

For distance vision, the eye looks through the central part of the lens, while near vision is obtained by rotation of the eye to look through the bottom part of the lens. Therefore, it is necessary that the eye pivot in relation to the lens in order to permit both distance and near vision. FIG. 1a illustrates this phenomenon with a diagram of an eye seeing distant vision through a traditional bifocal lens and FIG. 1b shows this same eye seeing near vision.

This type of lens has the inconvenience that the patient, in order to see near, must turn the eyes downward in their orbit into an unnatural position (FIG. 1b). The natural gesture is to lower the head so that each eye looks at the objects straight on in natural position in its orbit, but in this case, as shown in FIG. 1c, the bifocal lens, which has pivoted with the head at the same time as the eye, cannot play its proper role for near vision.

Additionally, the range of use of bifocal lenses is limited. In fact, the different correction of near and distant vision is possible only if the eye can pivot in relation to the correction lens. That is the case for spectacle lenses or for hard contact lenses which rest in contact against the eyelids. On the contrary, this is not the case for soft contact lenses of which the edges pass beneath the eyelids without engaging on the eyelids and which adhere to the cornea. This perfect liaison between the eye and the soft lens, without great relative movement constitutes one of the essential advantages of the soft lenses which permits them to be tolerated by most patients.

Use of these soft lenses is thus restricted at this time to the correction of one single fault requiring one single predetermined value of optical powers. It is not possible to benefit from these lenses when the correction in vision is differential and requires different near and distant vision powers.

The present invention remedies the aforementioned inconveniences.

One object of the invention is to furnish an optical lens which will permit a differential vision correction of near and distant vision, without notable movement of the eye in relation to the lens, with the eye remaining in a natural position in its orbit.

Another object of the invention is to furnish a soft lens which benefits from the advantages of this type of lens and is also adapted to effect differential corrections.

Before defining the component means of the invention, the existence of a French Pat. No. 1,279,252 is noted, as it describes lenses of which certain provisions are analogous to those of the invention, including the presence in the lens of an inside cavity containing a liquid. At any rate, this provision as described in this patent allows simply for lenses having zones of different value optical power. These means are totally incapable of satisfying the aforementioned objectives, and besides, to obtain differential corrections, the eye must look through different areas of the lens, as illustrated in FIGS. 1a and 1b, and therefore must pivot in relation to said lens, as is the case for traditional hard lenses.

The optical lens disclosed by the present invention comprises two transparent walls defining an internal space between them, and at least one transparent liquid of predetermined optical index enclosed in this space in such a manner as to occupy it in part; according to the invention, the two walls have a form which is adapted to limit an internal space having a very reduced capillary volume extending over a useful vision area $Z_o$ (surrounding the optical center of the lens), and the quantity of liquid contained in the internal space is such that said liquid is entirely situated in the bottom part of the lens outside of the capillary volume when the lens is in vertical or nearly vertical position (horizontal or near horizontal optical axis), and that said liquid fills the capillary volume by the effect of the capillary forces when the lens is tilted in relation to the vertical to a tilt which is at least equal to a predetermined minimum angle ($\alpha$) (optical axis tilted relative to the horizontal by an angle at least equal to $\alpha$).

The liquid can thus be displaced by the effect of the capillary forces when the lens is tilted: by a simple movement of the head which tilts the lens. The capillary volume which surrounds the useful vision zone $Z_o$ is filled with liquid althrough it carried none initially. The light rays passing through this zone $Z_o$ are subjected initially only to the optical effect of the walls. After tilting of the head and without any notable movement of the eye in relation to the lens, these rays are subjected to the optical effect of the liquid which has come into position of their passageway.

In the case of a lens intended for an eye necessitating an optical power $P_1$ for near vision, the curvature of the walls on zone $Z_o$ and the optical index of the liquid are selected so that the lens has a power $P_1$ suitable for distance vision in the absence of liquid in the capillary volume, and a power $P_2$ suitable for near vision in the presence of said liquid in said capillary volume. The patient always looks through the useful vision zone $Z_o$ of the lens without rotation of the eye in relation to the lens. When the patient looks into the distance, with the head nearly erect, the lens is vertical or near vertical and the capillary space is devoid of liquid so that the light rays passing through zone $Z_o$ are subjected to the power $P_1$ which is suitable for distant vision. On the contrary, for near vision, the head of the patient is tilted and the liquid fills the capillary space and confers to zone $Z_o$ a power of $P_2$, greater than $P_1$, suitable for near vision.

The transparent walls of the lens can be realized of a flexible synthetic material and the lens is then adapted to be applied on the cornea of the eye as soft contact lens. The near vision is obtained, in the absence of any relative movement of the lens in relation to the eye, by the simple natural movement of tilting the head.

The walls of the lens can also be realized of a rigid transparent material such as glass or rigid synthetic material; the lens is then adapted either to be applied on the cornea of the eye as a hard contact lens or to be mounted in spectacle frame.

The following description in reference to the attached drawings is intended to illustrate the invention as a nonlimiting example.

FIGS. 1a, 1b, 1c, already mentioned are diagrams to illustrate the use of traditional bifocal lenses.

FIGS. 2a, 3a and 2b, and 3b show the principle of function of a lens according to the invention, showing it in axial cross section (FIG. 2) and in frontal view (FIG. 3) in a vertical position (all FIGURES with the letter a) and in tilted position (all FIGURES with the letter b).

Figures 1A, 1B, 1C:
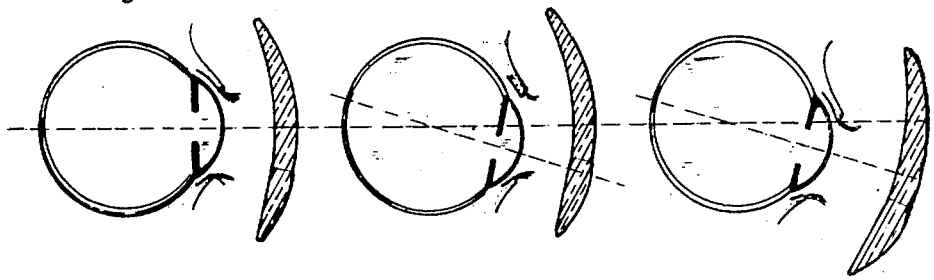

The lens of FIGS. 2a, 3a, 2b and 3b is formed of two transparent walls 1 and 2 of which the edges 1a and 2a are united and adhered together to limit an internal space 3, in which is found a suitable quantity of a transparent liquid 4 of predetermined optical index, (i.e. index of refraction). This liquid can be introduced after closure through a fine passage which is thereafter blocked.

Walls 1 and 2 are of a form adapted so that space 3 forms a capillary volume 3a which is very thin, situated in the central zone $Z_o$ which constitutes the useful vision zone which surrounds the optical center 0 of the lens. In the example, the capillary volume 3a is contrived by an inside extra thickness such as 5, provided on the walls (and essentially on wall 1) and extending over zone $Z_o$.

The lens of FIGS. 2 and 3 is a thin edge of which one external face is convex and the other concave. Above the liquid, internal space 3 can contain air at atmospheric pressure. The inside and outside curvatures of the two walls 1 and 2 in zone $Z_o$ are provided so as to furnish, in the absence of liquid in this zone, an optical power suitable for distance vision for the patient.

Also, the two walls have a form adapted to the outside of this zone $Z_o$ to limit an internal space 3 which has a greater peripheral thickness in order to reduce the effect of the capillary forces in this area and to constitute a liquid reservoir at the bottom of the internal space.

Figure 2A:
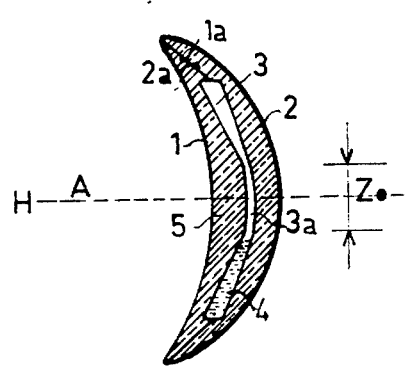
Figure 3A:
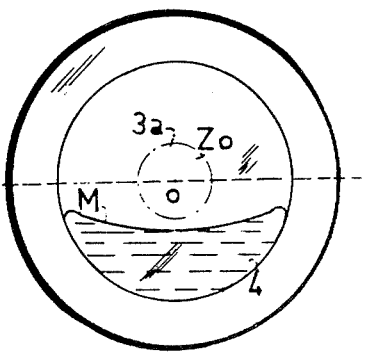
Figure 2B:
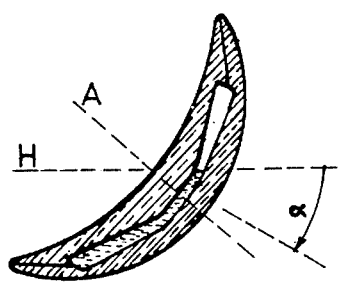
Figure 3B:
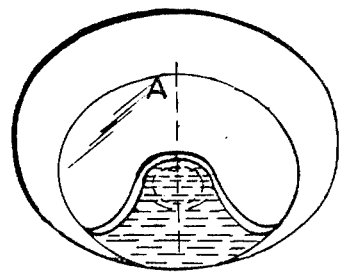

When the lens is tilted, liquid 4 is displaced by gravity into space 3. From a minimum tilt angle ($\alpha$), the meniscus M of the liquid reaches the border of zone $Z_o$ at the point of the capillary volume 3a and the liquid is aspirated by the effect of the capillary forces into this capillary volume 3a. When the lens is tilted, the liquid can then be displaced between two configurations. FIGS. 2a and 3a show a vertical position of the lens or near vertical (optical axis A at or near the horizontal H), wherein the liquid is situated at the bottom of the lens outside of the capillary volume and zone $Z_o$, so that the light rays passing through this zone are not subjected to the optical effect of the liquid. The other configuration, shown in FIGS. 2b and 3b, is a tilted position of the lens in relation to the vertical (optical axis A tilted in relation to the horizontal H at an angle at least equal to $\alpha$), the liquid fills the capillary volume 3a so that the light rays passing through zone $Z_o$ are subjected to the optical effect of the liquid. The range of the zone $Z_o$ is to correspond to the maximum diameter of the pupil of the eye which limits the opening of the incident bundle reaching the retina.

A number of suitable liquids may be used in the chamber, and the optical or refractive indexes of many liquids are given in standard reference tables. One suitable liquid may be a mixture of ethyl alcohol and water with an optical index of 1.30. Of course the specific liquid used would be chosen to provide the type of correction required by the patient, and may be readily selected.

It has been established that when a person passes from the state of using distant vision to the state of using near vision, for example to read or write, the head is tilted at an angle on the order of 50° to 60°. The form of walls 1 and 2 and the quantity of liquid are adjusted so that the value of the minimum angle $\alpha$ is on the order of approximately 30° to 40°.

Thus the lens can possess the necessary optical power for distant vision (power furnished by walls 1 and 2 alone) and the necessary optical power for near vision (power furnished by walls 1 and 2 and liquid 4). Of course, the lens is adapted in each case to the specific faults to be corrected. For example, for a simple presbyope with normal distant vision (simple failure of near vision accomodation), the inside and outside faces of wall 1 are parallel to each other in zone $Z_o$; also the inside and outside faces of wall 2 are parallel to each other in zone $Z_o$. In the absence of liquid, the lens is neutral and provides no correction (distant vision), when the liquid fills the capillary volume 3a, the lens becomes convergent and corrects the failure of accomodation of near vision.

Figure 4:
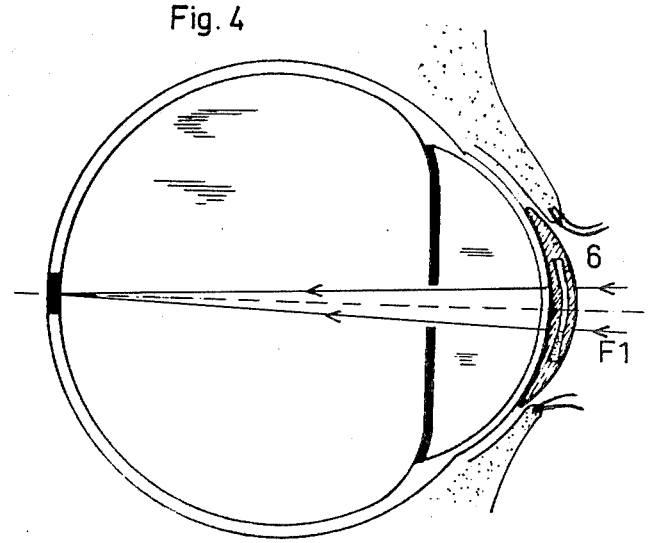
FIGS. 4, 5 and 6 show a soft lens according to the invention, on the cornea of the eye.
Figure 5:
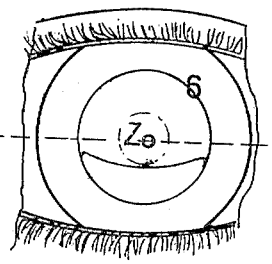
Figure 6:
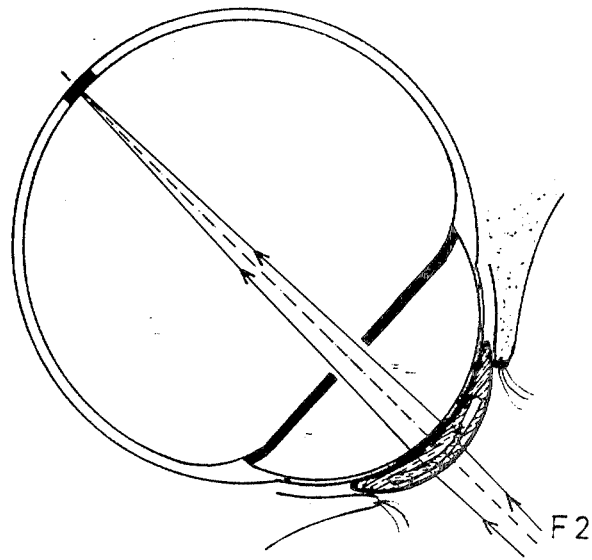

FIGS. 4, 5 and 6 show a lens 6 as described, of which the walls are of a hydrophillic synthetic material and which is applied on the cornea of the eye. The eyelids cover the edges of the lens; the lens fits the contour of the cornea perfectly and adheres to said cornea without any possibility of great displacement.

When the head is in an erect position (FIGS. 4 and 5), zone $Z_o$ around the optical center, and opposite the pupil of the eye, is without liquid and the parallel rays of bundle $F_1$ converge on the retina without accomodation.

When the head of the patient is tilted on the order of 50° for near vision (FIG. 6), the rays passing into the central zone $Z_o$ pass through the liquid and the convergence is accentuated by the optical power which is engendered, and in the absence of any relative displacement of the eye in relation to the lens. The rays diverge from bundle $F_2$ and converge on the retina without accomodation of the eye or with a suitable accomodation with the eye's weakened faculties.

Figure 7:
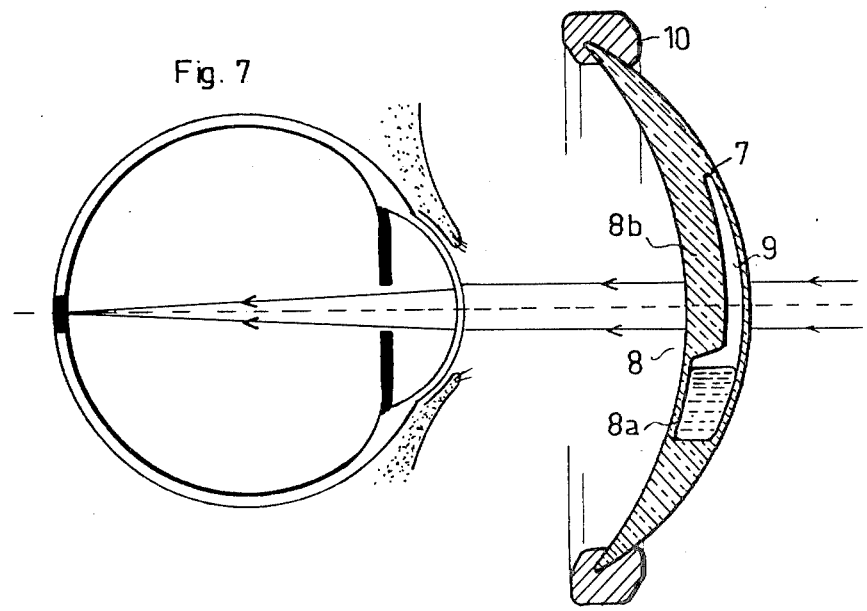
FIGS. 7 and 8 show one embodiment of a lens according to the invention mounted on a spectacle frame.
Figure 8:
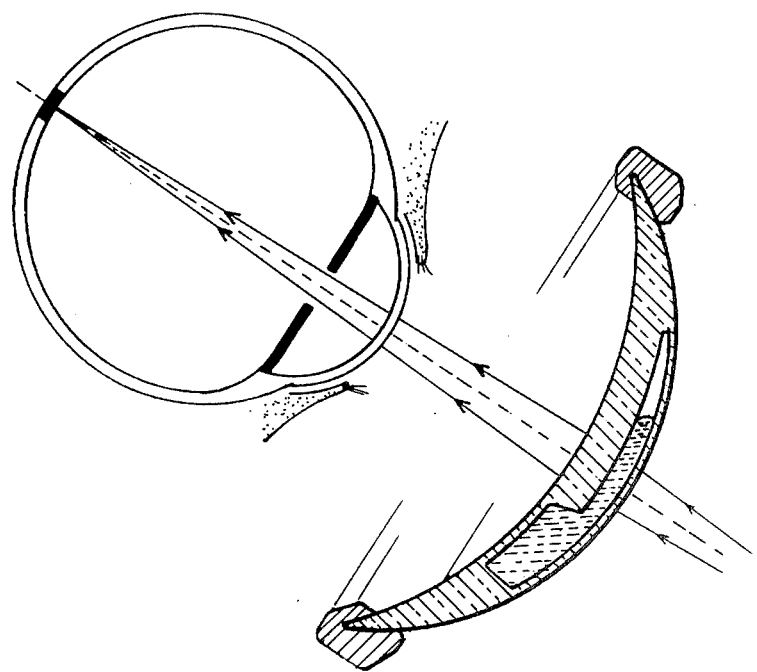

FIGS. 7 and 8 show a lens 7 of a similar type to that described, of which the walls are of glass and which is mounted on a spectacle frame 10. Wall 8 on the side toward the eye has a thin bottom portion 8a and a thicker top portion 8b in such a manner as to provide in the top portion a capillary volume 9 of reduced thickness and in the thin portion 8a a reservoir of liquid.

The principle of function is the same as aforementioned when the head is tilted for near vision, with the eye in its orbit in natural position (without notable rotation downward), the patient looks through the central zone $Z_o$ of the lens, of which the optical power is accrued by the effect of the liquid displacement.

Of course, the invention is not limited in any way but extends to all possible variations. Particularly, in the shown examples, zone $Z_o$ surrounds the optic center of the lens. It is possible to provide lenses where this is not the case, where zone $Z_o$ is situated below the optical center. Thus, in the vertical or nearly vertical position, a lens for distant vision benefits a visual field which is large since there is no liquid in the capillary volume (zone $Z_o$); in the tilted position, the field of vision for near vision will be considerably increased in relation to the traditional bifocal lenses, because of the capillary aspiration of the liquid into zone $Z_o$.

What is claimed is:

1. A convergent optical correction lens comprising a pair of transparent walls defining a closed internal space therebetween, at least one transparent liquid of predetermined index of refraction in a portion of said internal space, said walls being configured so as to establish in said internal space a zone having a reduced thickness, said zone surrounding the optical axis of said lens and having a capillary volume, said liquid being present in the lower part of said internal space when the optical axis is substantially horizontal, and said liquid filling said capillary volume by capillary action when said lens is tilted in relation to the vertical by at least a predetermined angle.

2. A convergent optical lens as in claim 1, wherein said capillary volume is formed by an interior extra thickness provided on at least one of said walls and extending over said zone.

3. A convergent optical lens as in claim 1, wherein said two walls have a form adapted to the exterior of said zone for defining an internal space with a greater peripheral thickness in order to reduce the effect of the capillary forces at the area of greater peripheral thickness and to form a liquid reservoir at the bottom of the internal space.

4. A convergent optical lens as in claim 1, wherein the form of said walls and the quantity of liquid are adjusted such that said predetermined angle is on the order of approximately 30° to 40°.

5. A convergent optical lens as in claim 1, intended for an eye which necessitates an optical power $P_1$ for distance vision and a greater optical power $P_2$ for near vision, wherein the curvature of the walls in said zone and the index of refraction of the liquid being such that the lens has a power $P_1$ in said zone without liquid in the capillary volume and a power $P_2$ in the presence of said liquid in said capillary volume.

* * * * *